Jan. 1, 1946.   P. McAULIFFE   2,392,053
HORSE CONTROL
Filed Dec. 11, 1942   2 Sheets-Sheet 1
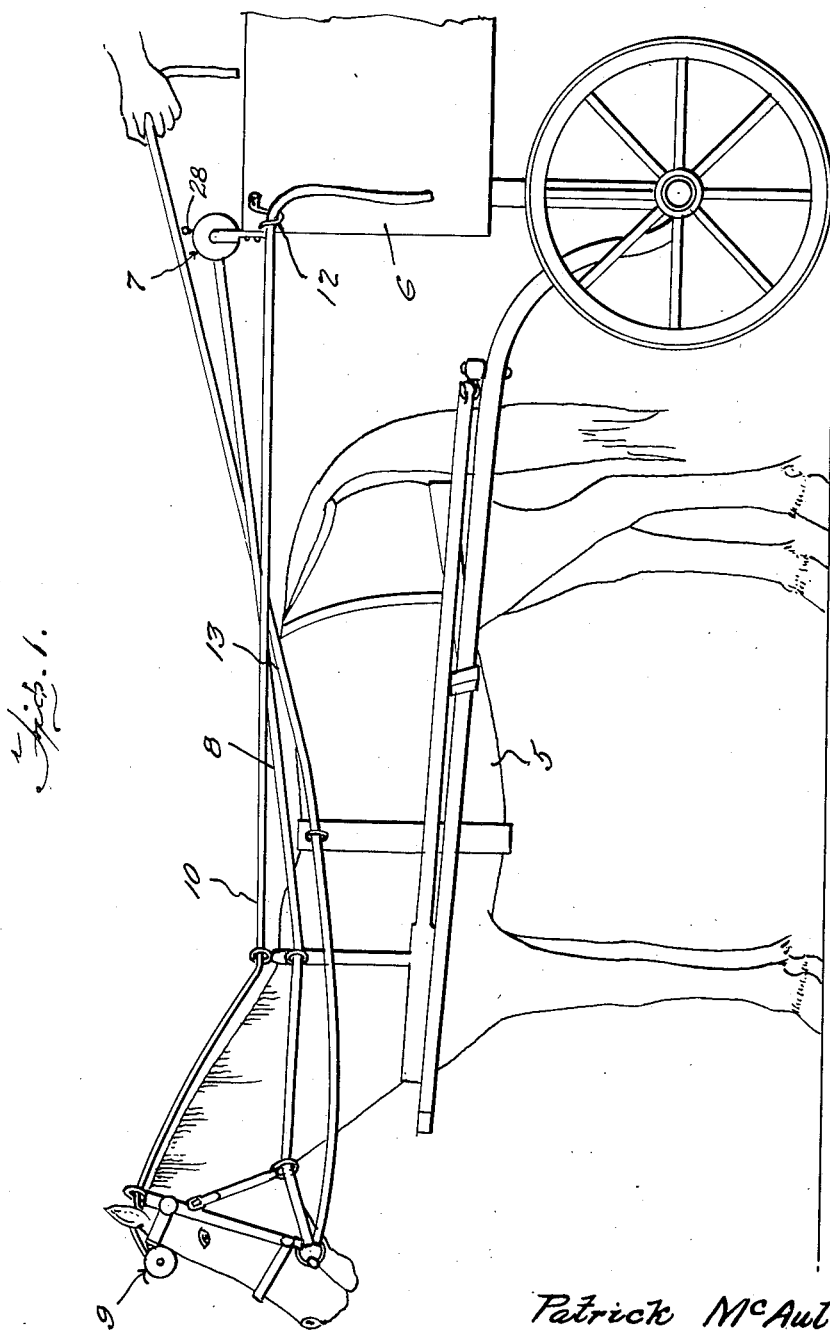
Inventor
Patrick McAuliffe
By Clarence A. O'Brien
and Harvey B. Jacobson
Attorneys

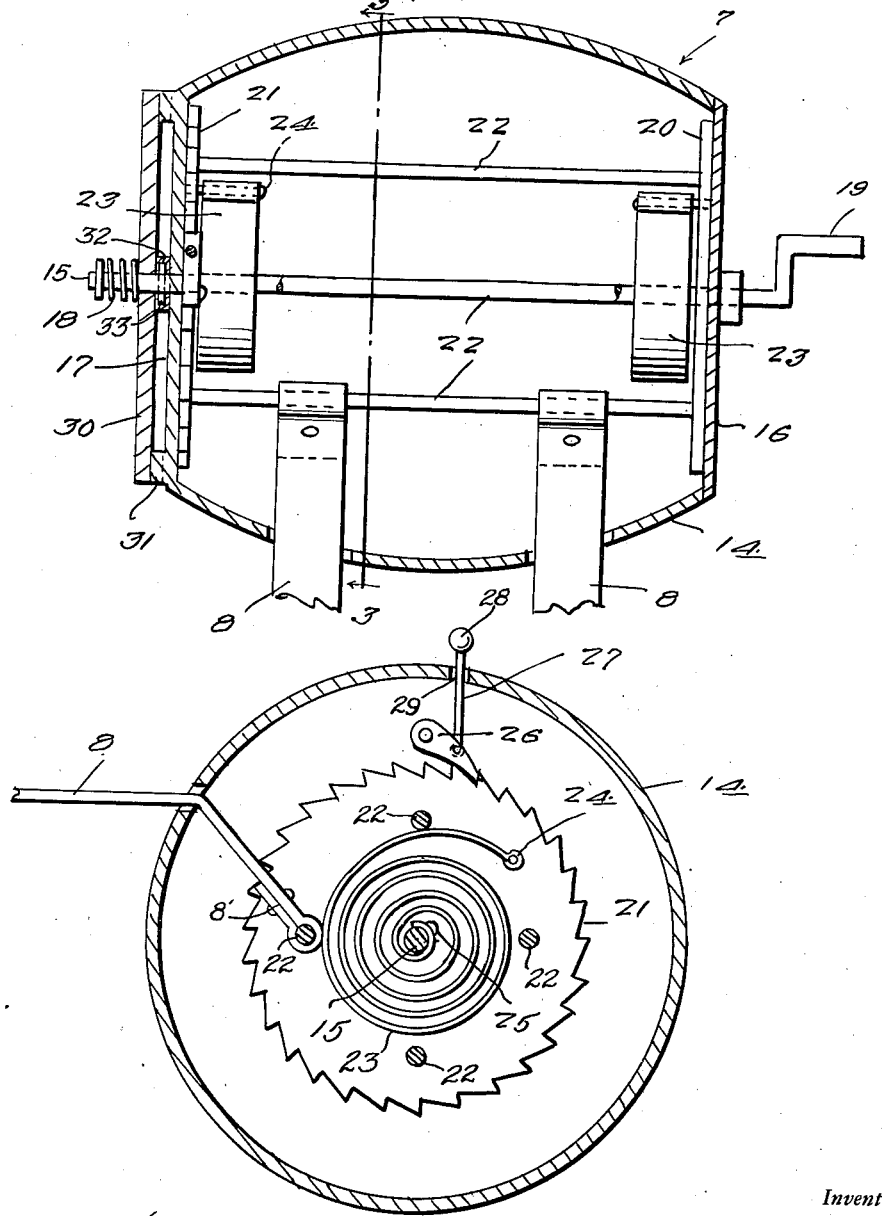

Patented Jan. 1, 1946

2,392,053

UNITED STATES PATENT OFFICE 2,392,053

HORSE CONTROL

Patrick McAuliffe, New York, N. Y.

Application December 11, 1942, Serial No. 468,740

1 Claim. (Cl. 280—186)

This invention relates to new and useful improvements in controlling horses and more particularly horses that have a tendency to run away. The principal object of the present invention is to provide appliances for use in conjunction with working horses whereby the reins are automatically pulled in the event the horse makes an effort to run wild.

Other objects and advantages of the invention will become apparent to the reader of the following description.

In the drawings:

Figure 1 represents a fragmentary side elevational view showing the improved horse control applied.

Figure 2 is a vertical sectional view through the reins operator.

Figure 3 is a section on the line 3—3 of Figure 2.

Referring to the drawings wherein like numerals designate like parts, it can be seen in Figure 1, that numeral 5 denotes a horse, while numeral 6 denotes a wagon. On the wagon 6 is a unit generally referred to by numeral 7 for automatically controlling a pair of supplemental reins 8. The parts designated 9, 10 and 12 constitute a horse blinding unit forming no part of the present invention and which need merely be identified herein. Numeral 13 denotes the usual manually operated reins.

The automatic reins control 7 is clearly shown in Figures 2 and 3 and consists of a case 14 having a shaft 15 disposed longitudinally therethrough and through its end walls 16, 17 for rotation therein. One end of this shaft 15 has sleeved thereon a compression spring 18 while the other end has a hand crank 19.

The shaft 15 carries a disk 20 and a ratchet wheel 21 and rods 22 bridge the disk 20 and ratchet wheel 21 to form a reel rotatable about said shaft 15 and on which the reins 8 can wind being fastened, as at 8' to one of the rods 22.

A pair of coiled springs 23, 23 each has one end anchored as at 24 to the disk 20 or the ratchet wheel 21 and its opposite end anchored as at 25 to the corresponding end portion of the shaft 15.

Numeral 26 denotes a dog for dogging the ratchet wheel 21 and which is pivotally mounted on one end wall of the case 14 with a rod 27 extending therefrom and through an opening 28 in the top of the case 14 where it is provided with a knob 29 whereby it can be easily grasped and manipulated to disengage the dog 26 from said ratchet wheel 21.

Obviously, as shown in Figure 2, a plate 30 on the shaft 15 having clutch teeth 31 between itself and the end wall 17 afford means whereby the shaft 15 is normally held against rotation. The plate 30 has a diametrical hub slot 32 therein receiving a cross pin 33 in the shaft 15 and the compression spring 18 bears against the plate 30 to yieldingly maintain the clutch teeth 31 engaged.

To condition the described appliance for operation, the springs 23 are wound up by rotating the shaft 15, through the medium of the crank 19, counter-clockwise, as viewed in Figure 3. During this operation, the dog 26 holds the ratchet wheel 21, and hence the reel of which said wheel 21 forms a part, against rotation with said shaft 15. As the shaft 15 is thus rotated, the plate 30 is caused to similarly rotate, through the slot and pin connection 32, 33, the clutch teeth 31 camming said plate 30 in opposition to the compression spring 18 laterally so that the teeth on the plate 30 ratchet over the teeth of the end wall 17 to permit the plate 30 to rotate. When the springs 23 are fully wound, the clutch teeth 31 hold the shaft 15 against rotation clockwise and the springs 23 wound. The supplemental reins 8 are normally loose and unwound. If the horse 5 should start to run away, the driver may cause the supplemental reins 8 to be wound up by the appliance so as to exert a sharp, strong pull thereon tending to check the horse. This may be accomplished by merely pulling on the rod 28 to disengage the dog 26 from the ratchet wheel 21, whereupon, the springs 23 will unwind to cause the reel, of which said ratchet wheel 21 forms a part, to revolve counter-clockwise and wind up the supplemental reins 8 on the rods 22 of said reel.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

Apparatus for controlling horses comprising a case adapted to be mounted on a horse-drawn vehicle and comprising end walls, a shaft extending through said case and journalled in said end walls for rotation therein, said shaft having a hand crank on one end thereof for rotating the same, a disc rotatable on said shaft adjacent one end wall of the case, a ratchet wheel rotatable on said shaft adjacent the other end wall of said case, rods extending between said disc and wheel and forming therewith a reel, a pair of reins fixed to one of said rods for winding around the other rods and being slidably extended through said case, a pair of convolute springs connected to said shaft and to said disc and wheel, respectively, for winding by rotation of the shaft in one direction and unwinding to rotate the reel, a releasable ratchet in said case for dogging said wheel to restrain the reel against rotation, and coacting devices on said shaft and one of said end walls, respectively, for preventing said shaft from rotating in a direction to unwind said springs.

PATRICK McAULIFFE.